United States Patent [19]
Goossen et al.

[11] Patent Number: 5,396,357
[45] Date of Patent: Mar. 7, 1995

[54] FAULT TOLERANT OPTICAL CROSS-CHANNEL DATA LINK

[75] Inventors: Emray R. Goossen, Albuquerque, N. Mex.; Larry A. Nelson, Bellevue, Wash.; James W. Woods, Albuquerque, N. Mex.

[73] Assignee: Honeywell Inc., Minneapolis, Minn.

[21] Appl. No.: 187,420

[22] Filed: Jan. 25, 1994

[51] Int. Cl.$^6$ ............ H04B 10/20; H04J 14/00
[52] U.S. Cl. .................. 359/119; 359/110; 359/127; 359/152; 370/16.1; 371/20.6; 340/825.05
[58] Field of Search ............... 359/118–119, 359/110, 124, 125, 127, 152, 164; 370/16.1, 124; 340/825.05; 371/20.6; 364/713

[56] References Cited

U.S. PATENT DOCUMENTS

| | | | |
|---|---|---|---|
| 4,704,713 | 11/1987 | Haller et al. | 359/119 |
| 4,889,404 | 12/1989 | Bhagavatula et al. | 359/124 |
| 4,947,459 | 8/1990 | Nelson et al. | 359/110 |
| 4,973,169 | 11/1990 | Slonecker | 359/124 |
| 4,991,229 | 2/1991 | Nelson et al. | 359/144 |
| 5,035,375 | 7/1991 | Friedenthal et al. | 244/3.12 |
| 5,278,824 | 1/1994 | Kremer | 370/16.1 |
| 5,307,353 | 4/1994 | Yamashita et al. | 371/20.6 |

FOREIGN PATENT DOCUMENTS

| | | | |
|---|---|---|---|
| 9110298 | 7/1991 | WIPO | 359/119 |

OTHER PUBLICATIONS

Wagner et al., "Multiwavelength Ring Networks for Switch Consolidation and Interconnection" Supercomm ICC '92–Discovering a New World of Communications pp. 1173–1179 vol. 3. 14–18 Jun. 1992.
"Modulation Techniques for Digital Communications: Multisymbol Signaling," Ch. 4–3 of *Information Transmission, Modulation and Noise* by Mischa Schwartz, McGraw Hill, Third Edition, pp. 224–231 (1980).

*Primary Examiner*—Herbert Goldstein
*Assistant Examiner*—Kinfe-Michael Negash
*Attorney, Agent, or Firm*—Ronald E. Champion; Thomas J. Nikolai

[57] ABSTRACT

A cross-channel data link for interconnecting a plurality of computers together in a ring configuration using a single optical fiber between adjacent communication nodes includes wavelength division multiplexing circuitry in a way that improves the fault diagnostic capabilities of the system. By using a particular transmission protocol in which optical data representing signals of two discrete wavelengths are fed through a single optical fiber with one progressing in the clockwise direction and the other in a counterclockwise direction in two recurring time frames, at the conclusion each of the computers is guaranteed to have identical data irrespective of any single point failure in the data link.

6 Claims, 3 Drawing Sheets

FAULT TOLERANT OPTICAL CROSS-CHANNEL DATA LINK

BACKGROUND OF THE INVENTION

1. Field of the Invention

This invention relates to an improved cross-channel data link of the type comprising an element of a fault tolerant computing system.

2. Discussion of the Prior Art

There are a significant, and growing, number of computer applications which demand a higher level of reliability and availability than can be practically achieved with conventional "single thread" systems, such systems being of the type wherein a single fault can cause a fatal error. An avionic computer control system of the so called fly-by-wire type is illustrative. Here, the flight of the aircraft and the safety of its crew depends upon the continuous error free operation of the computer system.

Fault tolerant computing requires some form of redundancy of computing resources to enable fault isolation and continued operation in spite of isolated faults. The preferred method is known as N-modular redundancy with majority voting, where the modular element may be any computing resource, but is typically a complete general purpose computer, including its associated input/output circuitry. The remaining discussion will assume that the redundant element is in fact such a computer.

In this arrangement, a limited number of faults can be tolerated. Implementing this concept requires that all modules execute identical programs on identical computers in substantial synchrony. Since all computers operate on the identical input data in synchronism, it is thus possible to instantaneously compare the output data from each and vote to determine the correct result, even though one or more of the modules may be in error, i.e., only the majority need be correct. The preferred means for maintaining synchronization, comparing computational results and exchanging failure status information, is a cross-channel data link which permits the exchange of data on a periodic basis. A typical application may require an exchange of 5,000 to 10,000 bits each processing frame, i.e. every 10 to 20 milliseconds. Each computer analyzes the data received from all other computers and uses this data to either confirm that it is in synchronization or to re-establish synchronization if it has been lost. In addition, data is used to validate or evaluate the health of the system, or to vote against other components of the system.

The cross-channel data link is a critical element of the system. It should be designed to maximize reliability and to insure that no single point failure of the data link can prevent data exchange between any pair of computers since without this exchange, synchronization may be lost and the benefits of majority voting lost. It has been found desirable to employ fiber optic media to gain the benefit of improved electrical isolation, rejection of interfering signals, and the potential for higher channel capacity.

The prior art approach for a fiber optic, cross-channel data link for a triple-modularly redundant computing system is shown diagrammatically in FIG. 1. Each of computers 10, 12 and 14 execute identical programs in response to a common set of data inputs 16 and exchanges this data via a fiber optic cross-channel data link. The computer outputs on lines 18, 20, 22 are presented to majority output voting 24 which produces a correct output even when any one of computer outputs 18, 20 or 22 is incorrect. Similarly, the input voting 23 provides a majority of input signals such that all computations within the three computers proceed on identical input data.

Communication between the cross-channel data link and the computers is via bidirectional data buses 11, 13 and 15. The cross-channel data link is comprised of optical node controls 26, 28 and 30 plus optical fibers 32-42. Referring to optical node 26, each node is comprised of two optical transmitters of the light emitting diode type, such as 46 and 48, plus two optical receivers (photo detectors), such as 44 and 50. Alternatively, optical transmitters 46 and 48 may be replaced with a single optical transmitter and an optical splitter. Either arrangement provides a simultaneous bidirectional data path between any pair of computers. For example, the data path formed by transmitter 46 on node 26, optical fiber 36, and receiver 52 on node 28 allows data from computer 10 to be sent to computer 12.

Although this arrangement provides the requisite communication paths when all elements are operable, a failure of any one element in the data link can cause an operable computer to be declared faulty. It is well known in the art to reconfigure data channels to route data around a failed link.

Reconfiguration of a cross channel data link, however, is undesirable due to the potential to exacerbate the effect of faults. For example, re-routing circuitry could provide an alternate path through element 48, 34, 54, 56 and 42 in the event of a failure of the path formed by elements 46, 36 and 52. However, such circuitry adds the risk that a single failure of the re-routing circuitry could cause multiple data paths to fail. Such prior art arrangements further lack the ability to isolate a data link fault solely to the transmitter, fiber or receiver. Since these elements are typically in different line replaceable units, diagnostic tests are thus unable to determine which unit to replace to correct for certain faults. Such prior art arrangements are further incapable of performance level measurements which could identify impending failures for repair before an actual fault occurs. This is particularly problematic with optical fibers being subjected to high "g" accelerations during aircraft maneuvers. Fiber-optic links used with prior art cross-channel data links have required specialized equipment for measurement of link integrity by ground maintenance personnel. These measurements are inadequate when the system is installed in a moving vehicle such as a fighter aircraft. Latent failures or marginal thresholds may be exposed during a high "g" maneuver. Cracked fibers and/or misaligned connections can disable the system if the fiber shifts at all. The present invention provides for a continuous detection capability which equals or exceeds the equipment utilized by ground maintenance personnel. As a result, the system is able to compensate for loss of power thresholds by adjusting the transmitter power output and is able to reconfigure in a deterministic fashion in that it "knows" where the exact failure is.

Because the system of the present invention incorporates a built-in fault detection and isolation system, ground crews are not required to validate the system with additional hardware. The system confidence level exceeds that associated with prior art fiber-optic cross-channel data links due to the ability to verify integrity after the components are installed. It has been a requirement of the prior art systems that signals be injected into the fiber with the plural computers disconnected. Hence, when the connection is re-established, the contact itself is still in question. With the present invention, faults detected during a previous flight are made available to maintenance personnel in prognosticating repair actions.

Furthermore, because only three fibers are required to provide a fault tolerant system in accordance with the present invention, a higher reliability level is achieved, when compared to the prior art and, in addition, continued operation can be enhanced through fault detection and dynamic reconfiguration.

SUMMARY OF THE INVENTION

It is accordingly an object of this invention to provide a cross-channel data link having improved fault detection and fault isolation capability.

It is a further object of this invention to provide dynamic link degradation measurements and optical power management to detect impending failure and to insure adequate operating margins while maintaining optical transmitter power at the lowest possible level.

It is a further object of this invention to provide a graceful degradation through dynamic isolation and reconfiguration.

It is a still further object of this invention to provide an improved signal modulation and demodulation scheme which, in addition to enabling performance level measurement, provides better signal to noise margins.

A novel feature of the instant invention is the use of wavelength division multiplexing to improve fault diagnostic capability. Wavelength division multiplexing is a fairly well-known method by which a single optical fiber can support multiple channels and duplex operation. Each channel uses a different wavelength optical transmitter to communicate in a different region of the optical spectrum, analogous to the way radio signals are distinguished in the radio frequency spectrum. Optical gratings provide selective detection of each wavelength, analogous to the tuned circuits of radio receivers. Although it is well known to consider wavelength division multiplexing for long line communication where the added complexity of the circuitry can be weighed against many miles of optical fiber, it is not considered to be useful for short distance communication. However, in the context of the instant invention, it provides a unique advantage in maintainability and reliability of the fault tolerant computing system.

Described is a cross-channel data link which is operable to provide communication between the plural computing elements of an N-modularly redundant computing system in which the data link comprises a multiplicity of nodes interconnected in a ring configuration with each node being coupled to a clockwise adjacent node via a single optical fiber and to a counterclockwise adjacent node, via a different single optical fiber. Each node is coupled to one computing element of the N-modularly redundant computing system. Each of the nodes include a first and a second optical transmitter, a first and a second optical receiver, a first wavelength division multiplexing means coupled to the first optical transmitter and to the first optical receiver for multiplexing an optical signal transmitted by the node and traveling in a clockwise direction with an optical signal received by the node and traveling in a counterclockwise direction through the single optical fiber which joins the clockwise adjacent nodes.

Similarly, a second wavelength division multiplexing means is provided that is coupled to the second optical transmitter and the second optical receiver for multiplexing an optical signal transmitted by the node and traveling in a counterclockwise direction with an optical signal received by the node traveling in a clockwise direction through the single optical fiber joining the counterclockwise adjacent nodes. Each node also includes a controller that is coupled to one of the plural computing elements for exchanging data indicative of the instantaneous state of the plural computing elements. A two-stage modulator is also coupled to the controller and to the first and second transmitters while a two-stage demodulator is likewise coupled to the controller and to the first and second optical receivers.

In accordance with the present invention, the aforementioned two-stage modulator and two-stage demodulator include a first stage of the quadrature amplitude modulator type. The second stage of the two-stage modulator and the two-stage demodulator is of the frequency modulation type.

The aforementioned controller comprises a buffer memory along with a suitable control circuit for storing data received from each of the adjacent nodes during a first recurring time interval in the buffer memory and for propagating the data stored in the buffer memory to each of the adjacent nodes during a second time interval.

DESCRIPTION OF THE DRAWINGS

The features, objects and advantages of the invention will become apparent to those skilled in the art from the following detailed description of the preferred embodiment, when considered in conjunction with the accompanying drawings, in which like numerals in the several views refer to corresponding parts.

DESCRIPTION OF THE PREFERRED EMBODIMENT

Figure 1:
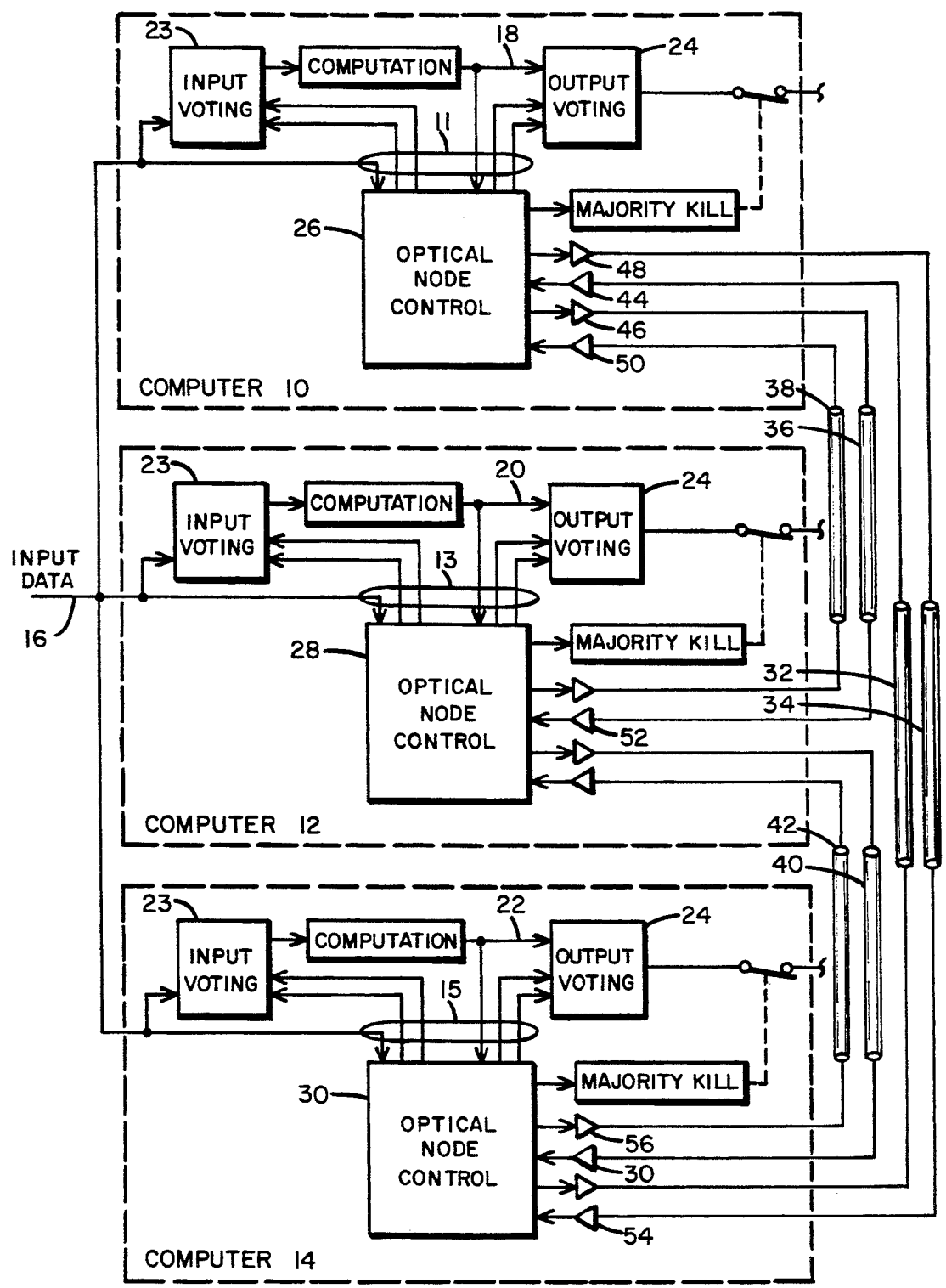
FIG. 1 is a block diagram illustration of a prior art triple-modularly redundant computing system incorporating a fiber-optic, cross-channel data link.
Figure 2:
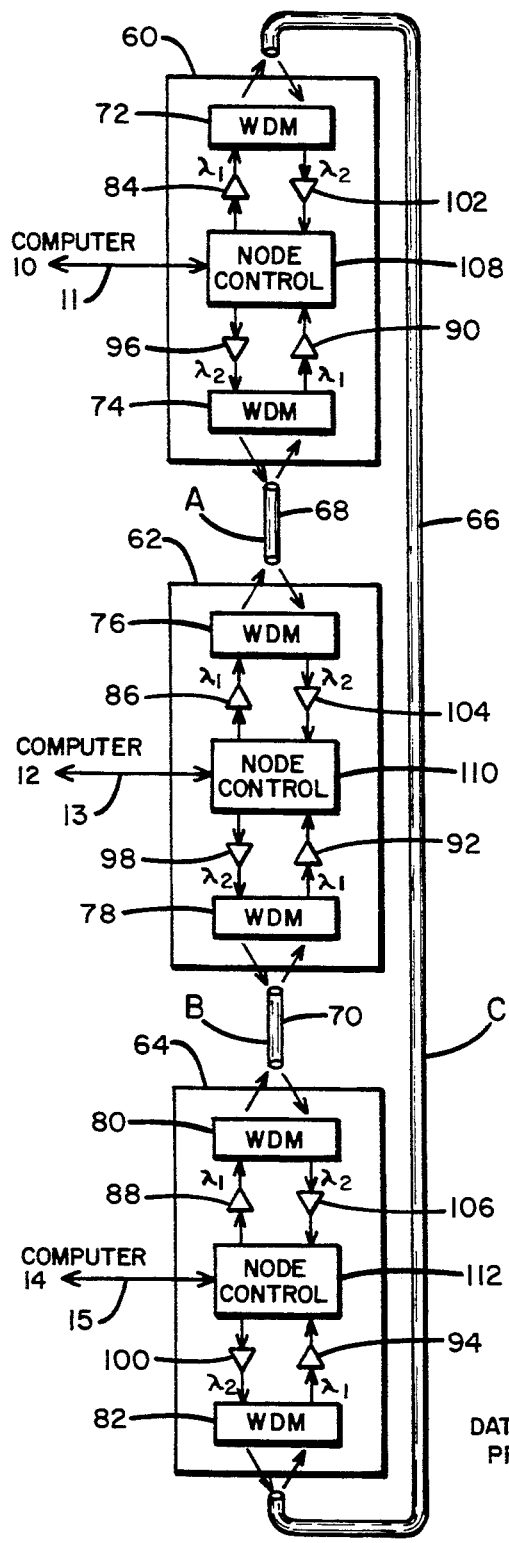
FIG. 2 illustrates by means of a block diagram a cross-channel data link illustrative of the present invention.

FIG. 2 shows a block diagram of a cross-channel data link which is illustrative of the preferred embodiment of the invention. As in the prior art arrangement of FIG. 1, communication with the other elements which comprise a fault tolerant system is via bidirectional data buses 11, 13, and 15 which connect to the computers 10, 12 and 14 of FIG. 1. The cross-channel data link is comprised of three nodes, 60, 62 and 64, which are interconnected in a ring configuration by only three optical fibers 66, 68 and 70, rather than six as in FIG. 1. Wavelength division multiplexing permits full duplex communication in a single optical ring. Wavelength $\lambda_1$ is a particular wavelength within the passband of the optical fiber which is modulated to provide communication in a clockwise direction through the ring while $\lambda_2$ is a different wavelength sufficiently separated from $\lambda_1$ that data can be simultaneously sent through the ring in a counterclockwise direction with substantially no crosstalk. Each node contains:

(a) two wavelength division multiplexers (WDM) 72–82;
(b) a $\lambda_1$ transmitter 84–88;
(c) a $\lambda_1$ receiver 90–94;
(d) a $\lambda_2$ transmitter 96–100;
(e) a $\lambda_2$ receiver 102–106; and
(f) a link node controller 108–112.

In a typical system, each of node controllers 108–112 and optical data links 66–70 represent, or are a part of, a different line replaceable unit. Since first level maintenance is typically accomplished by fault isolation and replacement, it is very desirable to conclusively isolate any fault to a single line replaceable unit. In the prior art, certain faults could not be isolated to a single unit. For example, in FIG. 1, the observation that a message launched from node 26 is not received by node 30 leaves the ambiguity that the optical transmitter 48, optical fiber 34, or receiver 54 is faulty. In the preferred embodiment, any optical fiber fault results in a loss of communication in both directions which can be readily distinguished from faults internal to the node which produce a unidirectional loss. This feature is combined with additional structure in each node to further enhance maintainability.

The cross-channel data link node controllers 108–112 may take a variety of forms ranging from a relatively simple controller which, at a minimum, performs the functions assigned to the two lowest levels of the seven layer protocol defined by ISO/OSI, i.e., "Physical" and "Transport" layers as those items are defined in the International Standards Organization Open System Interconnect specification, to highly autonomous controllers which additionally provide processing which might otherwise be performed by the respective computers. In particular, the Built In Test (BIT) processing, which will be subsequently described, may be variously apportioned between the node controller and the respective computer.

The function of the cross-channel data link is to permit computers 10–14 (FIG. 1) to periodically exchange the data needed to determine each others' health, to confirm synchronization or, alternatively, to re-establish synchronization in the event that it is anomalously lost. The data required is the set of machine state variables which uniquely define the last step of the application program a given computer has completed at a particular point in time. The instant invention additionally requires that BIT (Built in Test) data be exchanged.

Figure 3:
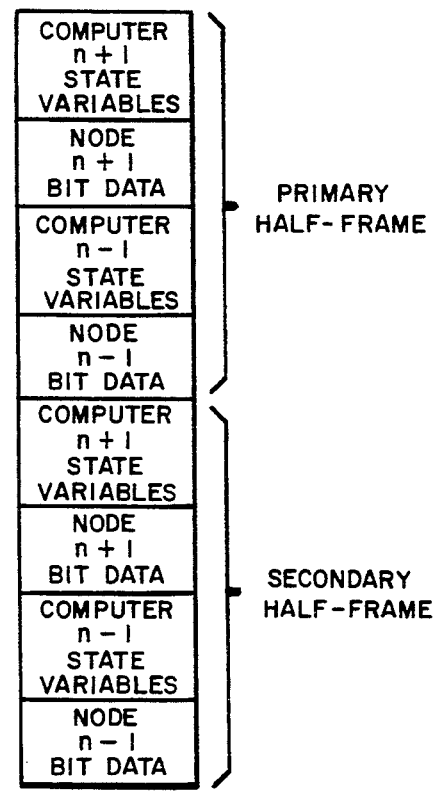
FIG. 3 illustrates the organization of a data packet assembled in the node controllers.

An example of one protocol which accomplishes this will be described with the aid of FIG. 3, which indicates the organization of the data packet periodically assembled by each of node controllers 108–112 for transmission to their respective computers (not shown) which are coupled to the bidirectional data buses 11, 13 and 15. The designations n+1 and n−1 refer to the computers and nodes positioned on the ring relative to the subject computer, n, in the clockwise or counterclockwise direction, respectively. Consider, for example, computer 12 and node 110. The primary half-frame is a block of 16 bit words comprised of four fields; namely, the state variables from computer 10, BIT data corresponding to node 60, computer 14 state variables and node 64 BIT data. Each field preferably contains an error correction sub-field. The secondary half-frame is the identical data found in the primary half-frame, but derived using alternative data routing through the data link.

Operation of the data link proceeds as follows: Each data link node controller contains its own crystal controlled primary timing source from which the timing required to exchange a frame of data is established. Upon system initialization, all nodes cooperatively execute a procedure which brings them into frame synchronization. All subsequent inter-node data transfers occur synchronously, frame-by-frame. During the first half of each frame, each node controller receives the primary half-frame and assembles it in a buffer memory. During the second half of the frame, each node controller receives and assembles the redundant secondary half-frame. Concurrent with the assembly of the next frame, each node controller composes and transmits a selected-half-frame from the buffer memory to its respective computer. The primary half-frame is sent, providing it contains no errors. In the event of errors in a given field of the primary half-frame, the corresponding field of the secondary half-frame is substituted, provided it contains no errors or if it contains correctable soft errors, while the primary half-frame field contains uncorrectable hard errors. In an alternative embodiment, where the node controller may perform BIT, any part of the BIT data may be conditionally suppressed for the data packet sent to the computer.

Figure 4:
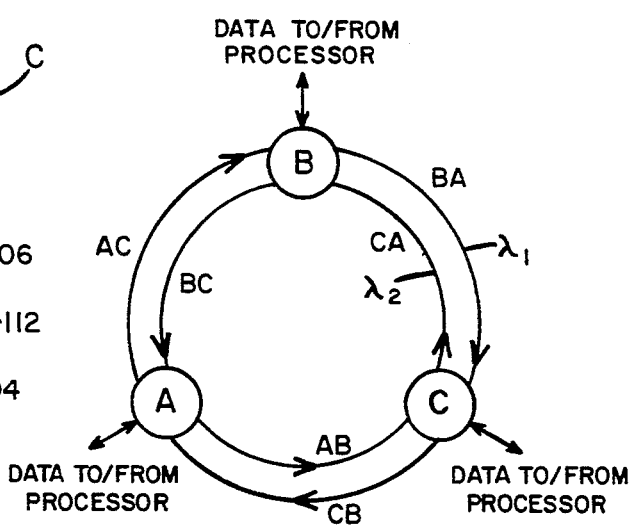
FIG. 4 is a diagram illustrating the cross-channel data transmission protocol.

FIG. 4 graphically depicts the transmission protocol. For clarity, data link nodes 60, 62 and 64 have been designated A, B and C, respectively. The pair of lines interconnecting the nodes correspond to the duplex channel of each of the interconnecting optical fibers. The outer (clockwise) ring corresponds to the $\lambda_1$ channel while the inner ring corresponds to the $\lambda_2$ channel. The two character designation associated with each channel is indicative of the channel utilization. The first character indicates the data transmitted during the first half of the frame while the second character indicates the data transmitted during the second half of the frame. Note during the first half-frame, all data propagates one place in a clockwise direction via the $\lambda_1$ channels and one place in a counterclockwise direction via the $\lambda_2$ channels, with the results of these transfers accumulated in the buffer memories of the respective destination nodes, thus providing a complete exchange of data. During the second half-frame, the data accumulated in the buffer memories is forwarded to the next adjacent node. Again, this is done simultaneously in both a clockwise and counterclockwise direction. The result is that the secondary half-frame contains the identical data found in the primary half-frame; however, it is sent via a circuitous route which does not depend upon the channel used to send a given field of data for the primary half-frame. This is one of the features which enables the data link to tolerate any single point failure, including the loss of any one optical fiber.

Figure 5:
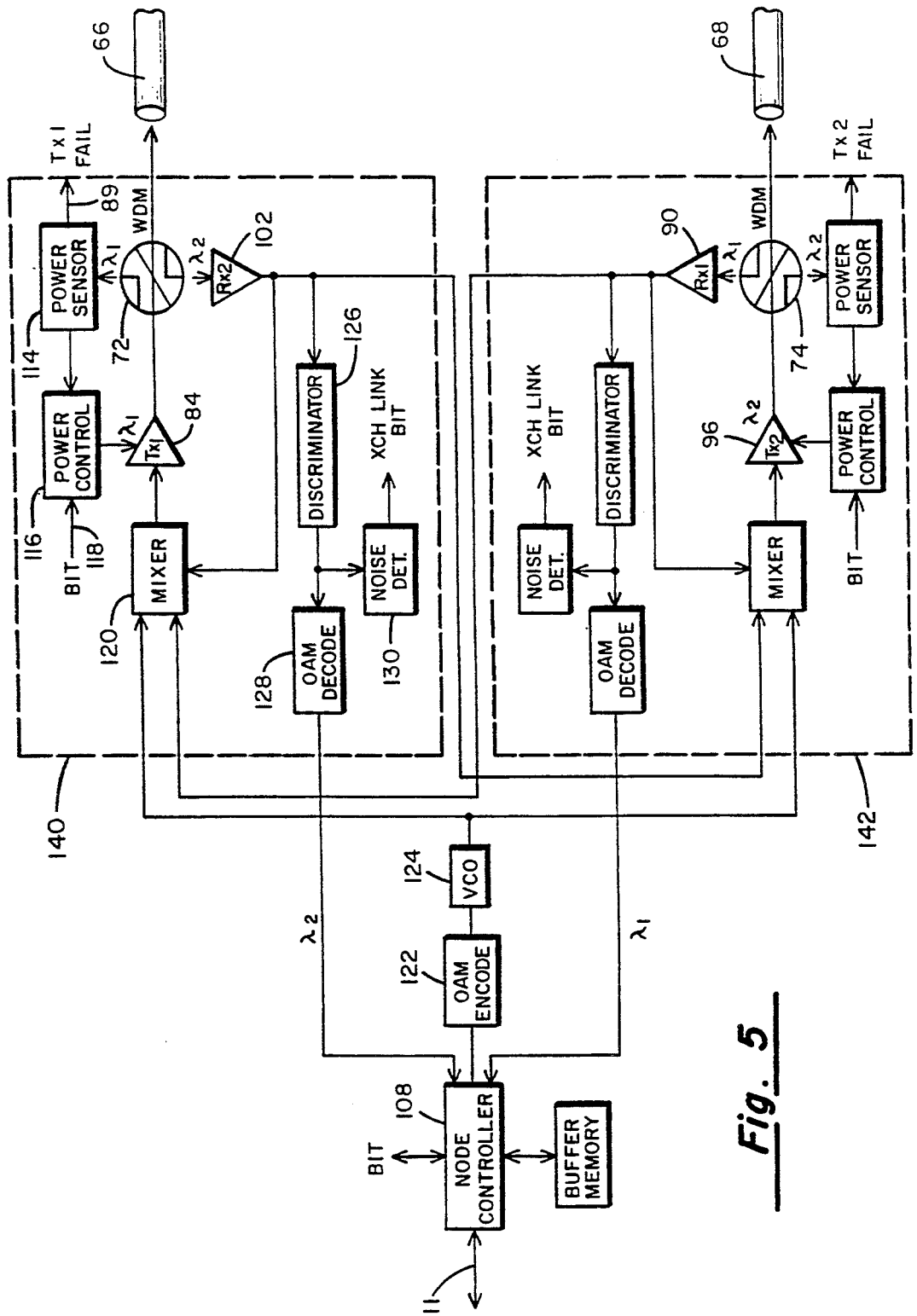
FIG. 5 is a more detailed block diagram of the cross-channel data link node in accordance with the present invention.

FIG. 5 is a detailed block diagram of the cross-channel data link node. The preferred embodiment employs two substantially identical optical components 140 and 142. Optical component 140 is comprised of an optical transmitter 84 which generates an optical signal of wavelength $\lambda$, most of which is directly passed through the diffraction grating of wavelength division multiplexer 72 and is coupled into optical fiber 66. This signal is designated $\lambda_1$ per the convention previously established. A small fraction of the $\lambda_1$ optical signal is reflected by the optical grating to power sensor 114.

Power sensor 114 generates a feedback signal to power control circuit 116 which is indicative of the optical power generated by transmitter 84. Power sensor 114 also generates a status bit which provides a pass/fail indication to node controller 108. Power control circuit 116 employs the power sensor feedback signal to control the electrical input power of transmitter 84 such that a specified level of optical power is launched into the optical fiber independent of environmental stress or component aging. The optical power level is specified by a digital BIT signal on line 118, provided by node controller 108. A more detailed description of this type of optical power control is contained in U.S. Pat. No. 4,991,229 issued to Larry A. Nelson et al. and assigned to the assignee of the present invention. The teachings of that patent are hereby incorporated by reference.

Mixer 120 provides three sources for the electrical input signal of transmitter 84. The signal which performs this selection is provided by node controller 108. For normal operation, the selected signal is also provided by node controller 108, via quadrature amplitude modulation (QAM) encoder 122 and voltage controlled oscillator 124.

The bit serial data from node controller 108 is encoded into two serial data streams; one of odd bits and the other of even bits. QAM encoder 122 generates a sine wave from which normal and quadrature carriers are derived. The odd serial bit stream modulates the odd carrier while the even bit stream modulates the quadrature carrier. The two modulated carriers are summed to form a quadrature amplitude modulated signal of the type conventionally used for radio frequency communication. A more detailed description of QAM can be found in the publication titled "Information, Transmission, Modulation and Noise" by Mischa Schwartz, McGraw Hill, Third Edition, 1980. A novel feature of the present invention is the additional step of further modulating the QAM signal to improve noise margins and allow performance level measurement. Although the QAM signal might be directly used to directly drive the fiber-optic transmitter, it is advantageous to interpose a frequency modulator. This is preferably accomplished with a Gallium Arsenide voltage controlled oscillator 124.

Noise is reduced to improve system reliability and survivability. More importantly, a measurement of the noise power density provides parametric information regarding the health of the data link which can be used to predict impending failure. It has been observed that with this type of double modulation, noise power density varies inversely and continuously with data link attenuation. Therefore, this one parameter is capable of detecting degradation of the transmitter, the wavelength division multiplexer, the optical couplings, optical fiber and the receiver, i.e., the entire physical link. It is thus possible to measure the effect of all environmental stress on the physical link, e.g., temperature or micro-bending of the optical fiber.

Discriminator 126 performs frequency demodulation to restore the signal from receiver 102 to a quadrature amplitude modulated signal. QAM decoder 128 further demodulates the received signal such that its output corresponds to the bit serial data generated by the QAM encoder of an adjacent node. Noise detector circuit 130 generates a digital exchange link BIT signal which is indicative of the average noise density of the QAM signal at the output of discriminator 126. Suitable noise detection apparatus is described in U.S. Pat. No. 4,947,459 entitled "Fiber Optic Link Noise Measurement and Optimization System". This signal is sensed by node controller 108 and is incorporated into the BIT field of the data packet exchanged with other node controllers.

The noise level measurement capability and the full duplex mode of operation permit a measurement of the noise for a given link as follows:

1. Measure the noise in the $\lambda_1$ channel with a constant voltage at the input of voltage controlled oscillator 124. Note that this parameter is generated by noise detection 130 and is communicated from the remote node to the local node via the BIT field.
2. Measure the total noise of the $\lambda_1$ and $\lambda_2$ channel in a loop back configuration with an unmodulated QAM carrier provided as input to voltage controlled oscillator 124.
3. Determine the noise of the $\lambda_2$ channel by subtracting the noise measured in step 1 with the noise measured in step 2.

It is desirable to provide loopback or echo of received data to the transmitting node for diagnostic purposes. During diagnostic testing, mixer 120 may select the output of $\lambda_2$ receiver 102 to loopback the signal received from optical fiber 66. Alternatively, receiver 90 may be selected for loopback on optical fiber 68.

The combined features of full duplex operation, measurement and control of optical power and noise level measurement, permit a variety of advantageous diagnostic strategies. For example, during maintenance diagnostics any node may determine the transmitted power corresponding to the soft error threshold. This is accomplished by incrementally decrementing the power of one of its transmitters and monitoring the BIT field returned by the destination node. Alternatively, during run time diagnostics any node may dynamically adjust transmitter power to compensate for transient environmental stress such that a minimally sufficient signal to noise ratio is maintained, e.g., three to four db over the measured noise. Controlling transmitter power to the actual level required, rather than a calculated worst case, allows the average power to be dramatically reduced, thus extending the mean time before failure of the transmitter without compromising bit error rate.

Although only a three node data link has thus far been considered, it is possible to extend the concept to any number of nodes. For example, five nodes requires that the synchronization frame comprise four fields, and that for each successive field, data is passed four places in both a clockwise and counterclockwise direction. This requires a higher bandwidth which may be accomplished by increasing the number of bits per symbol for quadrature amplitude modulation.

The components required for passing data through a computer from fiber to fiber are a minimum set consisting of the wavelength division multiplexer, the optical receiver, and the optical transmitter. These components have been found to contribute less than 0.05 failures per million hours to the link. The computers, processors, or other functional components cannot alter the data as it passes through, nor can their failure prohibit its transference. The only requirement is for the low level power required to operate the receiver and transmitter. Also, a side benefit is that there is no processor overhead required for handling this data. Control of the power levels by the system during self-test and during operation provides for increased reliability through operational power reduction, reduced transmitter and receiver costs, and the previously mentioned self-correction capability for in-flight threshold shifts.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A cross-channel data link which is operable to provide communication between plural computing elements of a fault tolerant computing system, said cross-channel data link comprising:

a multiplicity of nodes interconnected in a ring configuration, each node being coupled to a clockwise adjacent node via a single optical fiber and to a counterclockwise adjacent node via a different single optical fiber and each node being coupled to one of the computing elements of the fault tolerant computing system, said nodes each including:

a first and second optical transmitter, a first and second optical receiver, a first wavelength division multiplexing means coupled to said first optical transmitter and said first optical receiver for multiplexing an optical signal transmitted by said node and traveling in a clockwise direction with an optical signal received by said node traveling in a counterclockwise direction through the single optical fiber joining the clockwise adjacent nodes, a second wavelength division multiplexing means coupled to said second optical transmitter, and said second optical receiver for multiplexing an optical signal transmitted by said node and traveling in a counterclockwise direction with an optical signal received by said node traveling in a clockwise direction through the single optical fiber joining the counterclockwise adjacent nodes, controller means coupled to one of said plural computing elements for exchanging data indicative of the instantaneous state of said plural computing elements, a two-stage modulator coupled to said controller and to said first and second transmitters, and a two-stage demodulator coupled to said controller and to said first and second optical receivers.

2. The cross-channel data link as in claim 1 wherein a first stage of each of said two-stage modulator and said two-stage demodulator is of the quadrature amplitude modulator type and the second stage of each of said two-stage modulator and said two-stage demodulator is of the frequency modulation type.

3. The cross-channel data link as in claim 1 wherein said controller includes:

a buffer memory; and control circuit means for storing data received from each of said adjacent nodes during a first recurring time interval in said buffer memory and for propagating the data stored in said buffer memory to each of said adjacent nodes during a second time interval.

4. The cross-channel data link as in claim 1 and further including:

power sensing means coupled to said first wavelength division multiplexing means for sampling the power of an optical signal launched into said single optical fiber; and power level control means coupled to said power sensing means and to said first optical transmitter for adjusting the power of the optical signal being launched into said single optical fiber in accordance with a specified set-point.

5. The cross-channel data link as in claim 4 wherein said set-point is a built-in test parameter.

6. The cross-channel data link as in claim wherein said power sensing means includes means for generating a pass/fail status bit depending upon the correspondence of the power sampled by said power sensing means with said set-point.

* * * * *